(12) United States Patent
Uchida

(10) Patent No.: US 12,267,470 B2
(45) Date of Patent: Apr. 1, 2025

(54) INFORMATION PROCESSING APPARATUS, NON-TRANSITORY COMPUTER READABLE MEDIUM STORING PROGRAM, AND INFORMATION PROCESSING METHOD

(71) Applicant: FUJIFILM Business Innovation Corp., Tokyo (JP)

(72) Inventor: Takahiro Uchida, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 672 days.

(21) Appl. No.: 17/402,647

(22) Filed: Aug. 16, 2021

(65) Prior Publication Data

US 2022/0311894 A1    Sep. 29, 2022

(30) Foreign Application Priority Data

Mar. 26, 2021   (JP) ................. 2021-053911

(51) Int. Cl.
| | | |
|---|---|---|
| H04N 1/04 | (2006.01) | |
| G06V 30/414 | (2022.01) | |
| G06V 30/416 | (2022.01) | |
| H04N 1/00 | (2006.01) | |

(52) U.S. Cl.
CPC ....... *H04N 1/00782* (2013.01); *G06V 30/414* (2022.01); *G06V 30/416* (2022.01); *H04N 1/00766* (2013.01)

(58) Field of Classification Search
USPC ........................................ 358/474, 453, 462
See application file for complete search history.

(56) References Cited

U.S. PATENT DOCUMENTS

| | | | |
|---|---|---|---|
| 6,169,998 B1* | 1/2001 | Iwasaki | G06F 16/5846 |
| | | | 715/204 |
| 8,139,870 B2 | 3/2012 | Kato | |
| 11,100,318 B2 | 8/2021 | Asai | |
| 2022/0309274 A1* | 9/2022 | Umeda | G06V 30/414 |

FOREIGN PATENT DOCUMENTS

| | | |
|---|---|---|
| JP | 2007233913 | 9/2007 |
| JP | 2016126796 | 7/2016 |
| JP | 2020160629 | 10/2020 |
| JP | 2020181247 | 11/2020 |

OTHER PUBLICATIONS

"Notice of Reasons for Refusal of Japan Counterpart Application", issued on Jan. 7, 2025, with English translation thereof, p. 1-p. 10.

* cited by examiner

*Primary Examiner* — Cheukfan Lee
(74) *Attorney, Agent, or Firm* — JCIPRNET

(57) ABSTRACT

An information processing apparatus includes a processor configured to: set a rule for specifying a region in which a value of an item of an attribute assigned to a form shown by an image is shown in the image for each item, from a predetermined first rule, a second rule indicating an arrangement of the region for an element included in the form, which is input by a user, and a third rule indicating coordinates of the region in the image, which are input by the user; and extract the value of the item shown in the region specified by using the set rule.

20 Claims, 13 Drawing Sheets

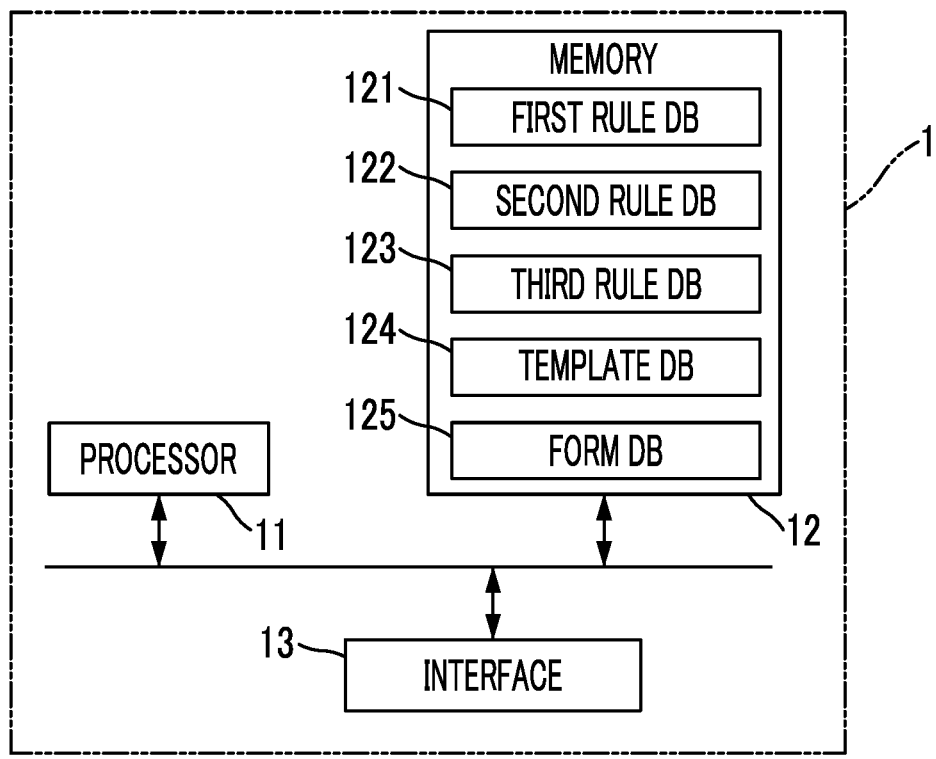

FIG. 7

| SECOND RULE ID | SECOND RULE | | |
| --- | --- | --- | --- |
| | ELEMENT | DIRECTION | DISTANCE |
| Ra1 | SUBJECT: | RIGHT | ... |
| Ra2 | PERSON IN CHAGE: | RIGHT | ... |
| Ra3 | MATTER | LEFT | ... |
| Ra4 | MR/MISS/MRS. | LEFT | ... |
| Ra5 | CONTACT POINT | RIGHT | ... |
| ... | ... | ... | ... |

| THIRD RULE ID | THIRD RULE | | |
| --- | --- | --- | --- |
| | REFERENCE POINT | WIDTH | HEIGHT |
| Rc1 | (15,150) | 200 | 50 |
| Rc2 | ... | ... | ... |
| ... | ... | ... | ... |

| TYPE ID | TYPE NAME | APPLICATION ID | APPLICATION NAME |
|---|---|---|---|
| T1 | MACHINE AND MATERIALS DEPARTMENT QUOTATION SHEET | Q1 | ESTIMATE WORK |
| T2 | ELECTRICAL EQUIPMENT DEPARTMENT QUOTATION SHEET | ... | ... |
| T3 | WORK ORDERING SHEET | ... | ... |
| ... | ... | ... | ... |

T1 / 1242

| ITEM ID | FIELD ID | ATTRIBUTE NAME | SELECTED RULE |
|---|---|---|---|
| A1 | Aq8 | SUBJECT | Rb1 |
| A2 | Aq1 | CUSTOMER NAME | Ra1 |
| A3 | Aq2 | QUOTATION NUMBER | Ra2 |
| A4 | Aq3 | QUOTATION DATE | Ra3 |
| A5 | Aq4 | PERSON IN CHARGE | Rb2 |
| A6 | Aq5 | DUE DATE | Ra4 |
| A7 | Aq6 | TOTAL PRICE | Ra5 |
| A8 | Aq7 | PAYMENT BANK | Rb6 |
| A9 | Aq9 | NOTE | Rc1 |
| ... | ... | ... | ... |

FIG. 15A

| DESIGNATION OF TYPE AND ACQUISITION OF SCANNING IMAGE | ? ☒ |
|---|---|
| DESIGNATION OF TYPE NAME | MACHINE AND MATERIALS DEPARTMENT QUOTATION SHEET — F1 |
| IMAGE DATA ACQUISITION | ACQUIRE — B1 |

FIG. 15B

| SELECTION OF APPLICATION | ? ☒ |
|---|---|
| SELECTION OF APPLICATION | ESTIMATE WORK ▼ — B2 |
| FIELD ACQUISITION | ACQUIRE — B3 |

FIG. 15C

SETTING OF ARRANGEMENT OF ATTRIBUTE NAME ? ☒

- CUSTOMER NAME
- QUOTATION NUMBER — L1
- QUOTATION DATE
- PERSON IN CHARGE
- DUE DATE
- TOTAL PRICE
- PAYMENT BANK
- SUBJECT
- NOTE

B4
- UP
- DOWN
- DELETE

FIG. 16

QUOTATION SHEET

DEAR KAWASAKI SHOKAI CO., LTD.   QUOTATION No. OM2020-05

PERSON IN CHARGE: MR/MISS/MRS. RYOJI TANABE   QUOTATION DATE: APRIL 25, 2020

SUBJECT: MATTER OF OA MACHINE AND MATERIALS IN FIRST HALF OF 2020   AIRAS OMORI CO., LTD.

QUOTATION IS AS FOLLOWS

〒XXX-XXXX
XX-CHO X-X, KAWAKOE CITY, SAITAMA PRECTURE

DUE DATE: SEPARATE CONSULTATION
PAYMENT CONDITION: MONTH-END SETTLEMENT AND NEXT MONTH-END PAYMENT
EXPIRY: WITHIN TWO WEEKS AFTER QUOTATION
DELIVERY LOCATION: TAKASAKI CITY, GUNMA PREFECTURE
TOTAL PRICE: ¥3,476,736 (INCLUDING TAX)

TEL: xx-xxxx-xxy
FAX: xxx-xxxx-xxx
E-Mail: odajima@xxx
PERSON IN CHARGE: ODASHIMA SHINSUKE

| No. | PRODUCT NAME | UNIT PRICE | QUANTITY | AMOUNT |
|---|---|---|---|---|
| ... | ... | ... | ... | ... |
| ... | ... | ... | ... | ... |
| ... | ... | ... | ... | ... |
| ... | ... | ... | ... | ... |

PAYMENT BANK: α BANK β BRANCH

NOTE: IF DELIVERY DATE IS DETERMINED, PLEASE INFORM PERSON IN CHARGE BY TELEPHONE

[TO RULE CORRECTION SCREEN]   [CONFIRM]

FIG. 18A

| ATTRIBUTE NAME | SELECTED RULE |
|---|---|
| [SUBJECT] | 2, Rb1 (RIGHT "SUBJECT:" ⋯) |
| [CUSTOMER NAME] | 1, Ra1 (LEFT 20 FROM "DEAR" ⋯) |
| [QUOTATION NUMBER] | 1, Ra2 (RIGHT OF "QUOTATION No." ⋯) |
| [QUOTATION DATE] | 1, Ra3 (⋯) |
| [PERSON IN CHARGE] | 1, Ra9 (⋯) — B7 |
| [DUE DATE] | 1, Ra4 (⋯) |
| [TOTAL PRICE] | 1, Ra5 (⋯) |
| [PAYMENT BANK] | 2, Rb6 ("PAYMENT BANK:" ⋯) |
| [NOTE] | NOTE — B8 |

CORRECTION OF SELECTED RULE

FIG. 18B

| [TOTAL PRICE] | |
|---|---|
| | 1, Ra9 (⋯) |
| | 2, Rb2 (RIGHT OF "PERSON IN CHARGE:" ⋯) — B7 |
| | 2, Rb4 (LEFT OF "MR/MISS/MRS." ⋯) — L2 |
| | 2, Rb5 (RIGHT OF "CONTACT POINT" ⋯) |
| | NEW CREATION |

FIG. 19

QUOTATION SHEET

DEAR KAWASAKI SHOKAI CO., LTD.   — D2
QUOTATION No. OM2020-05   — D3

PERSON IN CHARGE: MR/MISS/MRS. RYOJI TANABE — D5
QUOTATION DATE: APRIL 25, 2020 — D4

SUBJECT: MATTER OF OA MACHINE AND MATERIALS IN FIRST HALF OF 2020

AIRAS OMORI CO., LTD.
〒XXX-XXXX
XX-CHO X-X, KAWAKOE CITY, SAITAMA PRECTURE

QUOTATION IS AS FOLLOWS — D1

DUE DATE: SEPARATE CONSULTATION
PAYMENT CONDITION: MONTH-END SETTLEMENT AND NEXT MONTH-END PAYMENT
EXPIRY: WITHIN TWO WEEKS AFTER QUOTATION — D6
DELIVERY LOCATION: TAKASAKI CITY, GUNMA PREFECTURE
TOTAL PRICE: ¥3,476,736 (INCLUDING TAX) — D7

TEL: xx-xxxx-xxy
FAX: xxx-xxxx-xxx
E-Mail: odajima@xxx
PERSON IN CHARGE: ODASHIMA SHINSUKE — C1

| No. | PRODUCT NAME | UNIT PRICE | QUANTITY | AMOUNT |
|---|---|---|---|---|
| ... | ... | ... | ... | ... |
| ... | ... | ... | ... | ... |
| ... | ... | ... | ... | ... |
| ... | ... | ... | ... | ... |

PAYMENT BANK: α BANK β BRANCH — D8

NOTE: IF DELIVERY DATE IS DETERMINED, PLEASE INFORM PERSON IN CHARGE BY TELEPHONE — D9, C2

G

TO RULE CORRECTION SCREEN — B5
CONFIRM — B6

INFORMATION PROCESSING APPARATUS, NON-TRANSITORY COMPUTER READABLE MEDIUM STORING PROGRAM, AND INFORMATION PROCESSING METHOD

CROSS-REFERENCE TO RELATED APPLICATIONS

This application is based on and claims priority under 35 USC 119 from Japanese Patent Application No. 2021-053911 filed Mar. 26, 2021.

BACKGROUND

(i) Technical Field

The present invention relates to an information processing apparatus, a non-transitory computer readable medium storing a program, and an information processing method.

(ii) Related Art

In the technique disclosed in JP2016-126796A, even in a case where a virtual form is defined, in order to aggregate each document into the virtual form, a structural dictionary including layout information of each document is used as a reference using a document type ID. Layout coordinates of each target document are required in order to extract a value of an item.

The technique disclosed in JP2007-233913A includes an item value extraction unit that extracts a text string of an item value corresponding to an item name from a position near a text string corresponding to the item name, in a document image. Thus, in order to extract the item value, it is required to extract a text string of an item name corresponding to the item value from a text recognition result of a document image, and specify a position near the text string.

SUMMARY

Aspects of non-limiting embodiments of the present disclosure relate to an information processing apparatus, a non-transitory computer readable medium storing a program, and an information processing method that are for setting a rule for extracting a value of an item of an attribute assigned to a form from the form among a predetermined first rule, a second rule using an arrangement of elements of the form, which can be input by the user, and a third rule using coordinates in the form, which can be input by the user.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: set a rule for specifying a region in which a value of an item of an attribute assigned to a form shown by an image is shown in the image for each item, from a predetermined first rule, a second rule indicating an arrangement of the region for an element included in the form, which is input by a user, and a third rule indicating coordinates of the region in the image, which are input by the user; and extract the value of the item shown in the region specified by using the set rule.

BRIEF DESCRIPTION OF THE DRAWINGS

Exemplary embodiment(s) of the present invention will be described in detail based on the following figures, wherein:

FIG. 5 is a diagram illustrating an example of a configuration of an information processing apparatus 1;

FIG. 6 is a diagram illustrating an example of a first rule DB 121;

FIG. 7 is a diagram illustrating an example of a second rule DB 122;

FIG. 8 is a diagram illustrating an example of a third rule DB 123;

FIG. 9 is a diagram illustrating an example of a template DB 124;

FIGS. 15A to 15C are diagrams illustrating an example of a reception screen presented to the terminal 2 by the information processing apparatus 1;

FIG. 16 is a diagram illustrating an example of a screen in which a region is presented with being superimposed on an image of a form;

FIGS. 18A and 18B are diagrams illustrating an example of a correction screen; and FIG. 19 is a diagram illustrating an example of a screen in which a corrected region is presented with being superimposed on the image of the form.

DETAILED DESCRIPTION

Exemplary Embodiment

Configuration of Information Processing System

Figure 1:
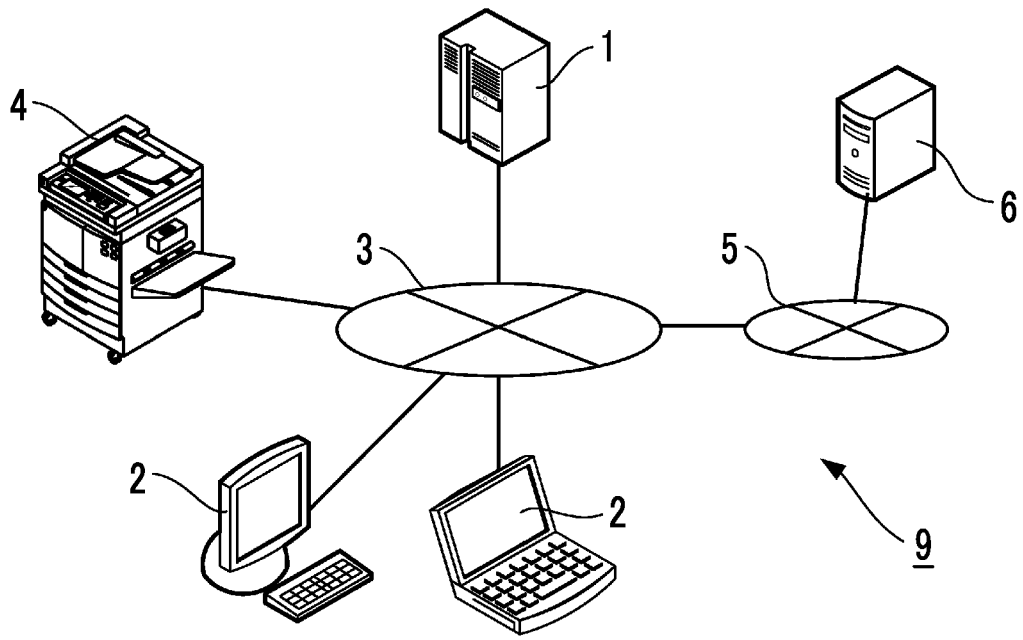
FIG. 1 is a diagram illustrating an example of an overall configuration of an information processing system 9.

FIG. 1 is a diagram illustrating an example of an overall configuration of an information processing system 9. The information processing system 9 illustrated in FIG. 1 is a system that scans a form and assigns an attribute to the form. As illustrated in FIG. 1, the information processing system 9 includes an information processing apparatus 1, a terminal 2, a communication line 3, an image scanning device 4, a communication line 5, and a server device 6.

The information processing apparatus 1 is an apparatus that extracts an attribute from an image showing a form and assigns the attribute to the form. The information processing apparatus 1 is, for example, a computer.

The terminal 2 is a terminal device operated by each user of the information processing system 9, and is, for example, a personal computer or the like.

The image scanning device 4 is, for example, a device that scans a document such as a form, in which information is described on a medium such as paper, and outputs image data indicating the corresponding image.

The communication line 3 is a line for communicably connecting the information processing apparatus 1, the terminal 2, and the image scanning device 4 to each other. The communication line 3 may be, for example, a local area network (LAN), a wide area network (WAN), the Internet, or a combination thereof.

The communication line 5 is a line for communicably connecting the communication line 3 and the server device 6 to each other, and is, for example, the Internet. The server device 6 is a device that provides a service by an application program (simply referred to as an "application" below) to various devices including the information processing apparatus 1 connected to the communication line 3 via the communication line 5.

Figure 2:
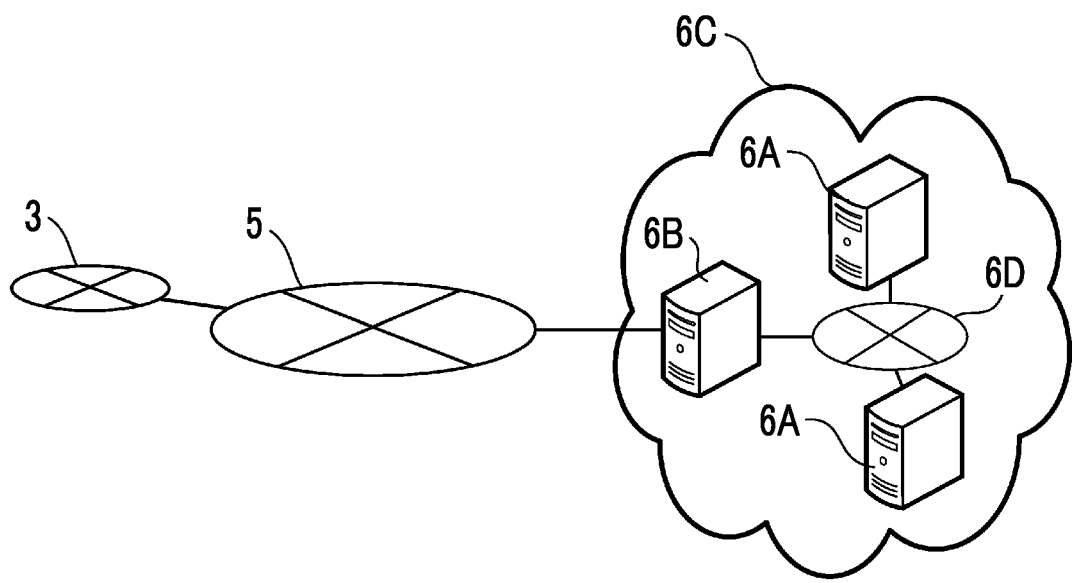
FIG. 2 is a diagram illustrating a cluster system 6C.

The information processing system 9 may include a cluster system that provides a so-called cloud service instead of the one server device 6 illustrated in FIG. 1. FIG. 2 is a diagram illustrating a cluster system 6C. The cluster system 6C includes a communication line 6D which is a LAN, a plurality of server devices 6A connected by the communication line 6D, and a gateway device 6B that connects the communication line 6D and the communication line 5. The plurality of server devices 6A are devices having the same functions as the above-described server device 6.

In this case, the gateway device 6B may monitor the processing statuses of the plurality of server devices 6A and select the server device 6A that provides the service requested by the information processing apparatus 1 via the communication line 5.

The numbers of the information processing apparatuses 1, the terminals 2, the communication lines 3, the image scanning devices 4, and the communication lines 5 in the information processing system 9 are not limited to the information processing apparatuses 1, the terminals 2, the communication lines 3, the image scanning devices 4, and the communication lines 5 illustrated in FIG. 1. For example, the information processing apparatus 1 may be configured by a cluster system in which a plurality of devices share functions.

Configuration of Server Device

Figure 3:
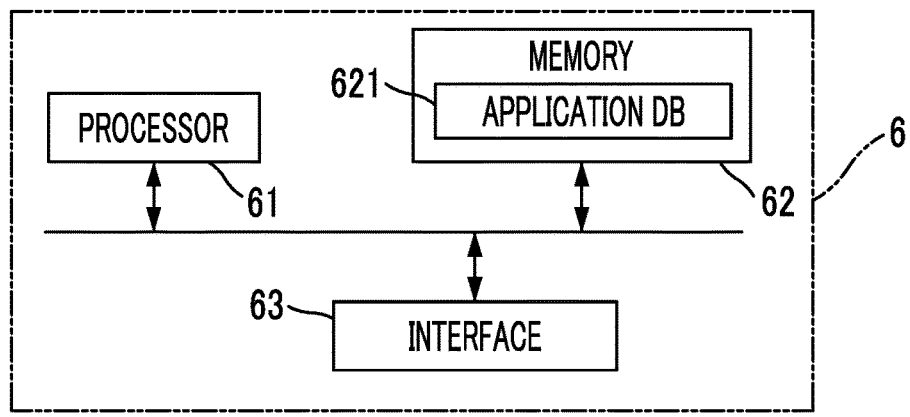
FIG. 3 is a diagram illustrating an example of a configuration of a server device 6.

FIG. 3 is a diagram illustrating an example of a configuration of the server device 6. The server device 6 illustrated in FIG. 3 includes a processor 61, a memory 62, and an interface 63. The components are communicably connected to each other, for example by a bus.

The processor 61 reads and executes a program stored in the memory 62, and thereby controls the units of the server device 6. The processor 61 is, for example, a central processing unit (CPU).

The interface 63 is a communication circuit that communicably connects the server device 6 to the information processing apparatus 1, the terminal 2, and the image scanning device 4 via the communication line 3 and the communication line 5 in a wired or wireless manner.

The memory 62 is a storage unit that stores an operating system, various programs, data, and the like read into the processor 61. The memory 62 includes a random access memory (RAM) and a read only memory (ROM). The memory 62 may include a solid state drive, a hard disk drive, or the like. The memory 62 also stores an application DB 621.

Figure 4:
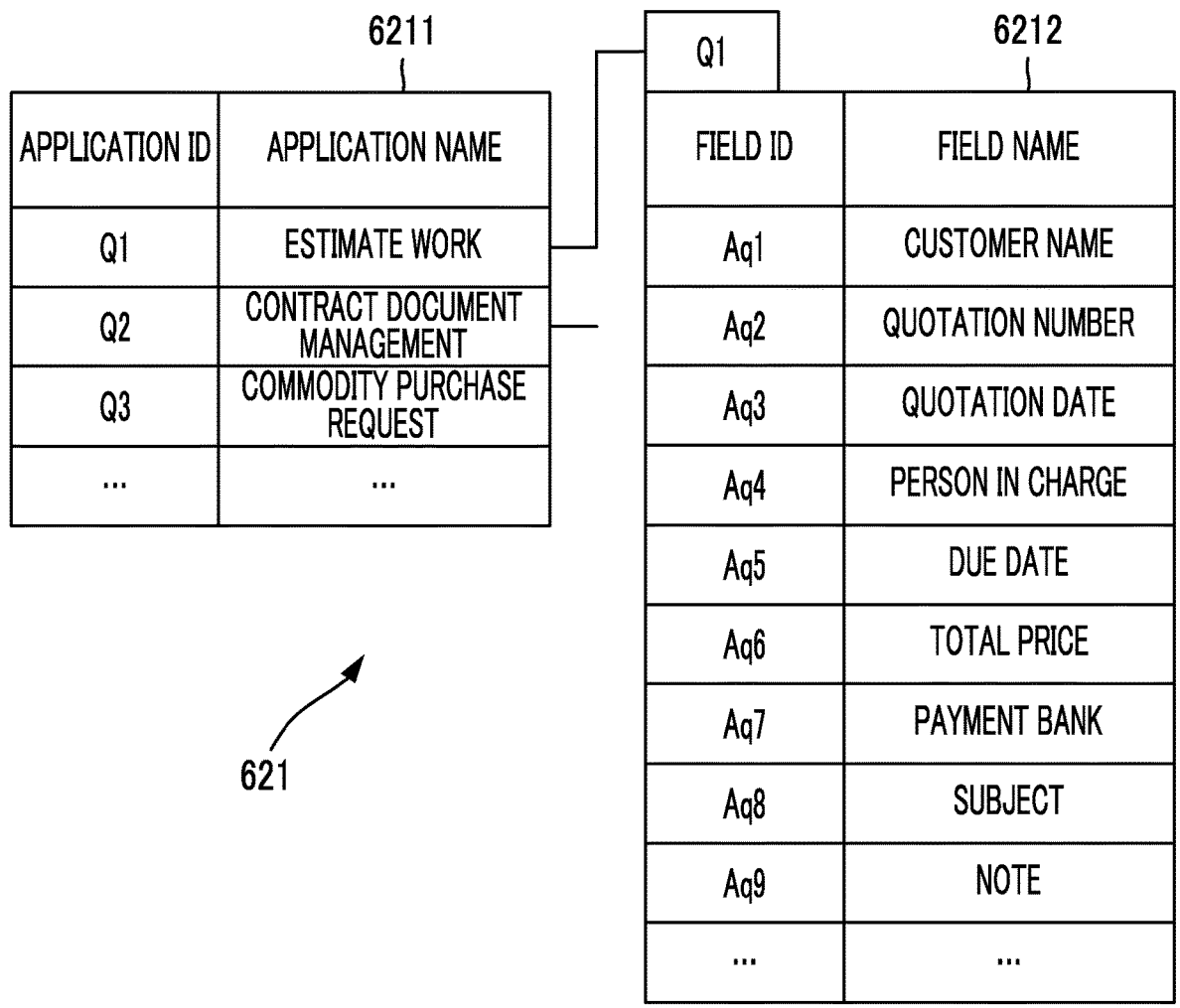
FIG. 4 is a diagram illustrating an example of an application DB 621.

FIG. 4 is a diagram illustrating an example of the application DB 621. The application DB 621 illustrated in FIG. 4 has an application ID list 6211 and a field ID list 6212. The application ID list 6211 is a list in which an application ID and an application name are listed in association with each other. The application ID is identification information of an application that is read and executed by the processor 61 of the server device 6. The application name is the name of the application.

The field ID list 6212 is a list associated with each application ID described in the application ID list 6211, and is a list in which pieces of identification information of one or more fields defined by the application identified by the application ID is listed. In the field ID list 6212, a field ID which is identification information of a field, and the field name which is the name of the field are stored in association with each other.

Configuration of Information Processing Apparatus

FIG. 5 is a diagram illustrating an example of a configuration of the information processing apparatus 1. The information processing apparatus 1 illustrated in FIG. 5 includes a processor 11, a memory 12, and an interface 13. That is, the information processing apparatus 1 is an example of an information processing apparatus including a memory and a processor. The components are communicably connected to each other, for example by a bus.

The processor 11 reads and executes a program stored in the memory 12, and thereby controls the units of the information processing apparatus 1. The processor 11 is, for example, a CPU.

The interface 13 is a communication circuit that communicably connects the information processing apparatus 1 to the terminal 2 and the image scanning device 4 via the communication line 3 in a wired or wireless manner. The interface 13 further connects the information processing apparatus 1 to the server device 6 via the communication line 3 and the communication line 5.

The memory 12 is a storage unit that stores an operating system, various programs, data, and the like read into the processor 11. The memory 12 includes a RAM and a ROM. The memory 12 may include a solid state drive, a hard disk drive, or the like. The memory 12 stores a first rule DB 121, a second rule DB 122, a third rule DB 123, a template DB 124, and a form DB 125.

FIG. 6 is a diagram illustrating an example of the first rule DB 121. The first rule DB 121 illustrated in FIG. 6 is a database that stores a rule being default (referred to as a first rule) for specifying a region in which a value (also referred to as an item value) of an item of an attribute assigned to a form is shown. The first rule DB 121 is prepared in advance by the information processing apparatus 1, and is not changed by the user. That is, the first rule is a predetermined rule. In the first rule DB 121 illustrated in FIG. 6, the contents of the first rule are associated with a first rule ID for identifying the first rule.

For example, in the first rule DB 121 illustrated in FIG. 6, a first rule identified by the first rule ID "Ra1" is a rule for specifying a region moved from a region in which a text string "dear" is shown to the left side by 20 to 90 millimeters in the image of a form. For example, a first rule identified by the first rule ID "Ra2" is a rule for specifying a region moved from a region in which a text string "quotation No." is shown to the right side by a predetermined distance in the image of the form.

The first rule is not limited to only the above-described rule based on the text string. For example, the first rule may be a rule for specifying a region by coordinates (also referred to as absolute coordinates) with the endpoint of the upper left corner of the image of the form as a reference.

FIG. 7 is a diagram illustrating an example of the second rule DB 122. The second rule DB 122 is a database storing a rule (referred to as a second rule) that is added to specify a region which is not specified by the first rule and uses an element in the image of the form. In the second rule DB 122 illustrated in FIG. 7, the contents of the second rule are associated with a second rule ID for identifying the second rule.

The second rule is, for example, a rule for specifying a region moved from a region in which various elements such as text strings and ruled lines are shown, in a predetermined direction at a predetermined distance in the image of the form. The position of the region in which the element is shown changes depending on description contents of the form or various situations such as deviation of paper feeding in a case of scanning the form. The second rule is a rule for specifying a region by arrangement for elements, that is, relative coordinates (also referred to as relative coordinates) between the elements. Thus, the region specified by the second rule is expected to have a common relation with the element defined by the second rule regardless of the position of the element defined by the second rule in the image of the form.

For example, in the second rule DB 122 illustrated in FIG. 7, a second rule identified by the second rule ID "Rb1" is a rule for specifying a region moved from a region in which a text string "subject:" is shown to the right side by a predetermined distance in the image of a form. Differing from the first rule, the second rule can be added or changed by an input of the user.

That is, the second rule is a rule input by the user and indicates the arrangement of the region for the element included in the form.

FIG. 8 is a diagram illustrating an example of the third rule DB 123. The third rule DB 123 is a database storing a rule (referred to as a third rule) that is added to specify a region which is not specified by the first rule and the second rule and uses absolute coordinates in the image of the form.

For example, in the third rule DB 123 illustrated in FIG. 8, a third rule identified by the third rule ID "Rc1" is a rule for specifying a rectangular region having a width of 200 mm and a height of 50 mm. In the third rule defines, for example, the position (also referred to as a reference point) of the upper left point of the above-described rectangle is defined to (15, 150) by the above-described absolute coordinates. Differing from the first rule, the third rule can be added or changed by an input of the user.

That is, the third rule is a rule input by the user and indicates the coordinates of a region in which the item value is shown in the image of the form.

FIG. 9 is a diagram illustrating an example of the template DB 124. The template DB 124 is a database that stores, as a template, the type of form and information of the attribute assigned to the form classified into the above type. The template DB 124 illustrated in FIG. 9 has a type list 1241 and an attribute name list 1242.

The type list 1241 is a list in which a type ID for identifying the type of form and an application ID for identifying an application associated with the type by the user are listed in association with each other. In the type list 1241 illustrated in FIG. 9, for each type ID, the name of the type (referred to as the type name) identified by the type ID, the application ID being identification information of the application associated with this type of form by the user, and an application name being the name of the application are stored in association with each other.

The attribute name list 1242 is a list associated with each type ID described in the type list 1241. The attribute name list is a list in which attribute names indicating attributes to be assigned to the type of form, which is identified by the type ID, are listed in order of being designated by the user. As the attribute names, field names acquired from the application associated with the above-described type of form by the user are utilized. The attribute name is associated with a rule selected to specify a region in which an item value corresponding to the attribute name is shown in the image of the form.

In the attribute name list 1242 illustrated in FIG. 9, an item ID for identifying the item of an attribute, the attribute name indicating the attribute, a field ID corresponding to the field name utilized as the attribute name, and a selection rule selected to specify a region in which an item value of the attribute, which is identified by the item ID, is shown are stored in association with each other.

Figure 10:
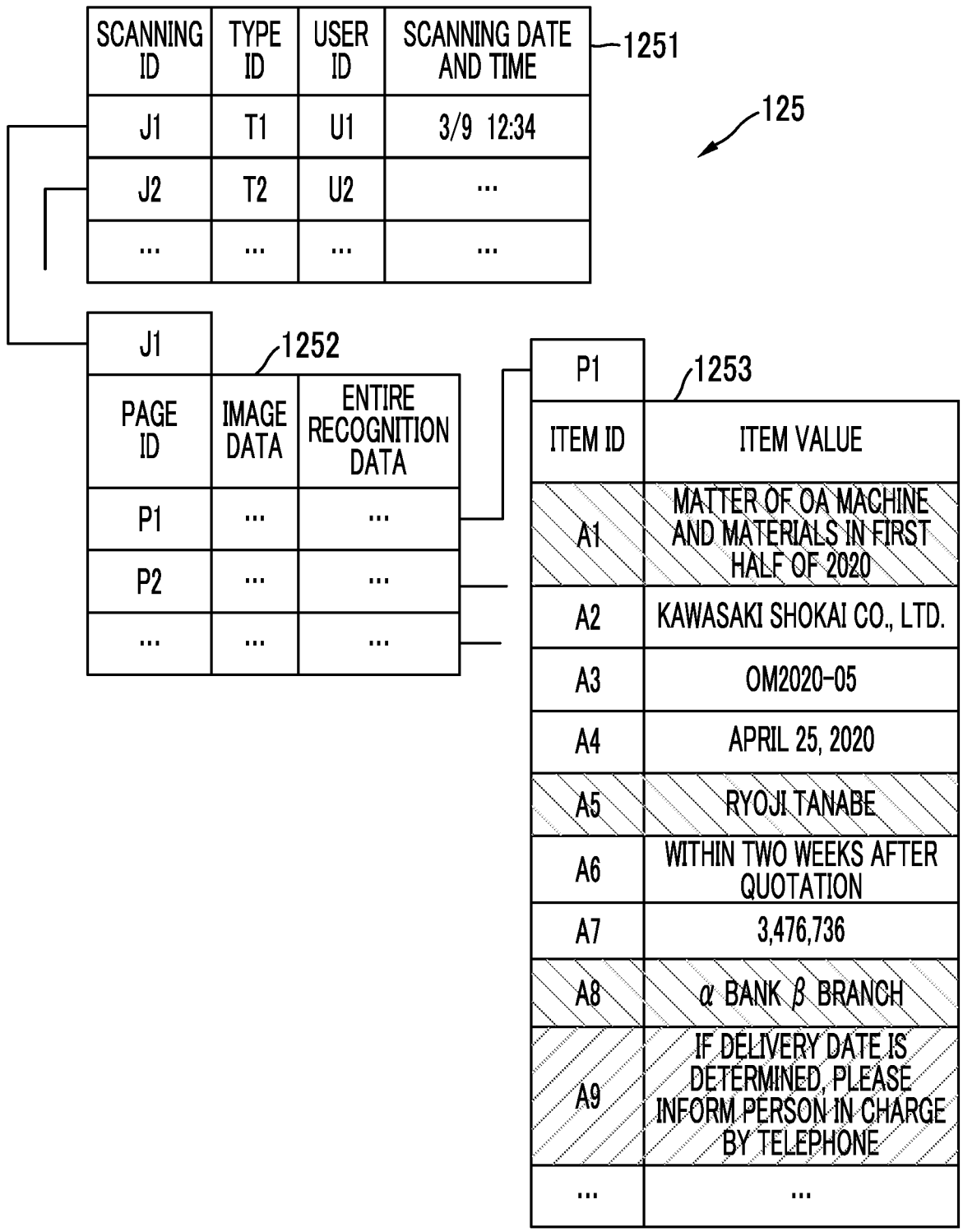
FIG. 10 is a diagram illustrating an example of a form DB 125.

FIG. 10 is a diagram illustrating an example of the form DB 125. The form DB 125 is a database that, in a case where the user designates the type of form for a bundle of one or more forms and causes the image scanning device 4 to scan the forms, stores an attribute assigned to each of the scanned forms.

The form DB 125 illustrated in FIG. 10 has a scanning process list 1251, a form page list 1252, and an item value list 1253. The scanning process list 1251 is a list in which a process (referred to as a scanning process) in which the image scanning device 4 scans a bundle of forms is listed. In the scanning process list 1251, a scanning ID is identification information for identifying one scanning process. The type ID is identification information of the type of the form scanned by the scanning process. The user ID is identification information of the user who performs the scanning process. The scanning date and time are information indicating the date and time in which the scanning process is performed.

The form page list 1252 is a list in which image data of a form scanned by the scanning process identified by each scanning ID described in the scanning process list 1251, and data (referred to as entire recognition data) recognized by performing optical text recognition on the entirety of the image data are stored for each page of the form. The page ID is identification information for identifying the page of the form, and is, for example, a number.

The item value list 1253 is a list in which the item value of an attribute assigned to a page of a form, which is identified by each page ID described in the form page list 1252, is stored. In the item value list 1253 illustrated in FIG. 10, the item ID is identification information for identifying the item of the attribute assigned to the page of the above-described form, and the item value is the value of the item.

Configuration of Terminal

Figure 11:
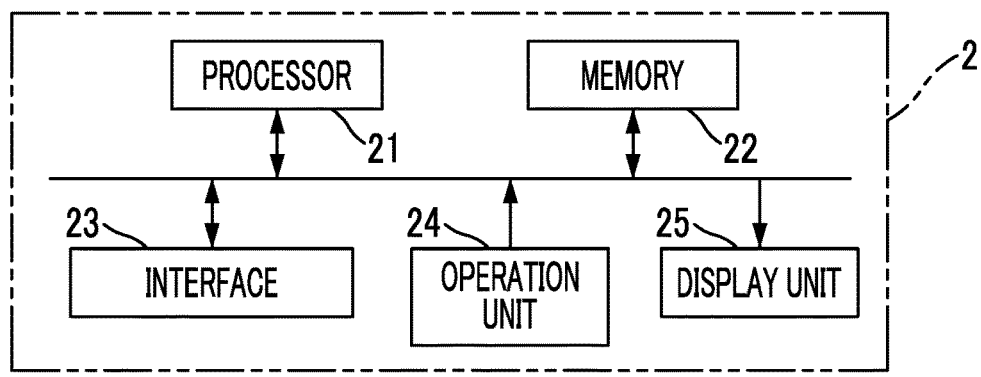
FIG. 11 is a diagram illustrating an example of a configuration of a terminal 2.

FIG. 11 is a diagram illustrating an example of a configuration of the terminal 2. The terminal 2 illustrated in FIG. 11 includes a processor 21, a memory 22, an interface 23, an operation unit 24, and a display unit 25. The components are communicably connected to each other, for example by a bus.

The processor 21 reads and executes a program stored in the memory 22, and thereby controls the units of the terminal 2. The processor 21 is, for example, a CPU.

The interface 23 is a communication circuit that communicably connects the information processing apparatus 1 and the image scanning device 4 with the terminal 2 via the communication line 3 in a wired or wireless manner.

The operation unit 24 includes an operation tool for issuing various instructions, such as operation buttons, a keyboard, a touch panel, and a mouse. The operation unit receives an operation and transmits a signal corresponding to the operation content to the processor 21.

The display unit 25 has a display screen such as a liquid crystal display, and displays an image under the control of the processor 21. A transparent touch panel of the operation unit 24 may be superposed on the display screen.

The memory 22 is a storage unit that stores an operating system, various programs, data, and the like read into the processor 21. The memory 22 includes a RAM and a ROM. The memory 22 may include a solid state drive, a hard disk drive, or the like.

Configuration of Image Scanning Device

Figure 12:
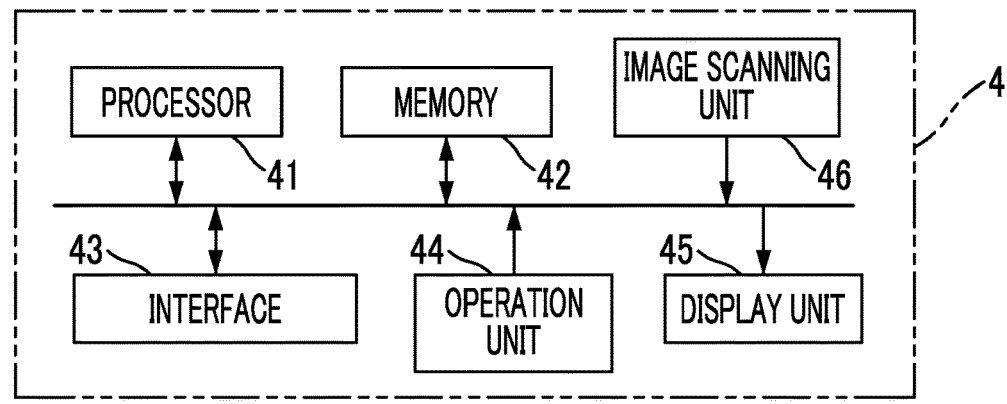
FIG. 12 is a diagram illustrating an example of a configuration of an image scanning device 4.

FIG. 12 is a diagram illustrating an example of a configuration of the image scanning device 4. The image scanning device 4 illustrated in FIG. 12 includes a processor 41, a memory 42, an interface 43, an operation unit 44, a display unit 45, and an image scanning unit 46. The components are communicably connected to each other, for example by a bus.

The processor 41 reads and executes a program stored in the memory 42, and thereby controls the units of the image scanning device 4. The processor 41 is, for example, a CPU.

The interface 43 is a communication circuit that communicably connects the information processing apparatus 1 and the terminal 2 with the image scanning device 4 via the communication line 3 in a wired or wireless manner.

The operation unit 44 includes an operation tool for issuing various instructions, such as operation buttons and a touch panel. The operation unit receives an operation and transmits a signal corresponding to the operation content to the processor 41.

The display unit 45 has a display screen such as a liquid crystal display, and displays an image under the control of the processor 41. A transparent touch panel of the operation unit 44 may be superposed on the display screen.

The memory 42 is a storage unit that stores an operating system, various programs, data, and the like read into the processor 41. The memory 42 includes a RAM and a ROM. The memory 42 may include a solid state drive, a hard disk drive, or the like.

The image scanning unit 46 includes platen glass, an irradiation device that irradiates a medium with light, an optical system that collects reflected light, an image sensor device such as a complementary metal oxide semiconductor (CMOS) image sensor or a charge coupled device (CCD) image sensor, and the like. The image scanning unit 46 scans an image formed on a form placed on platen glass, generates image data indicating the scanned image, and supplies the generated image data to the processor 41, under control of the processor 41. The image scanning unit 46 may include an automatic document feeder (ADF) that transports a form page by page.

Functional Configuration of Information Processing Apparatus

Figure 13:
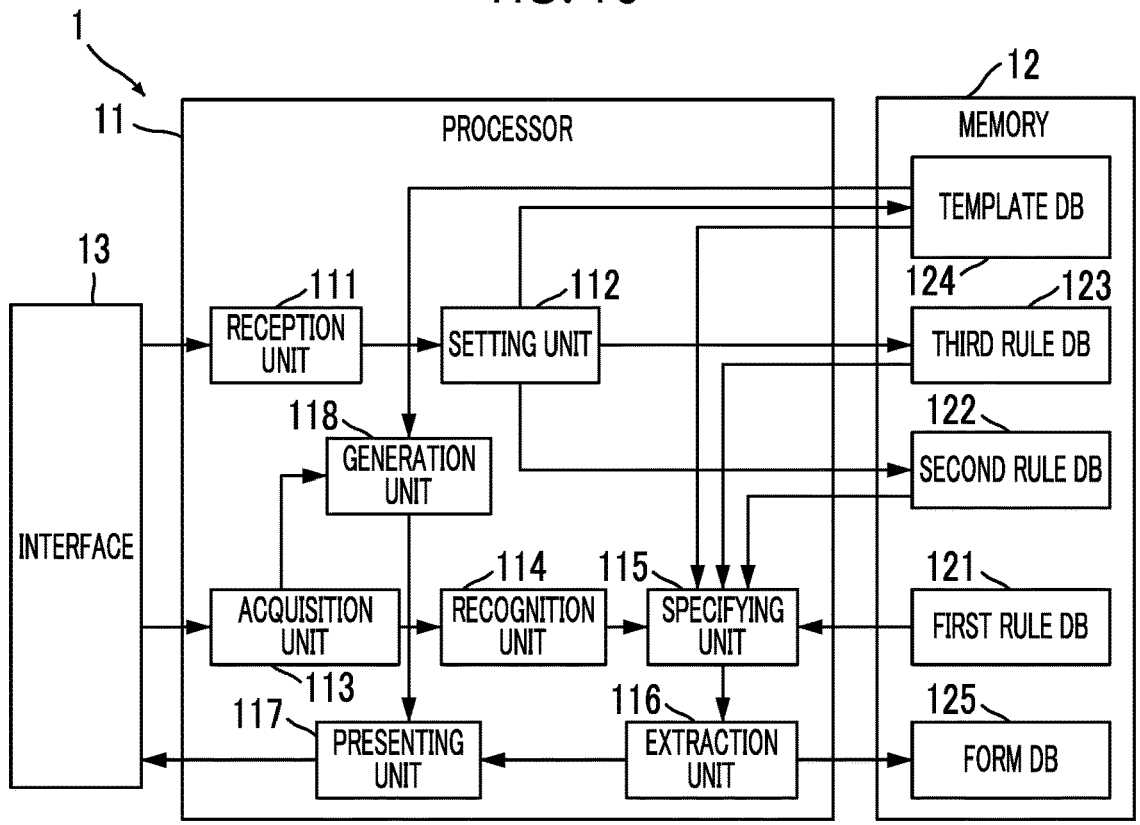
FIG. 13 is a diagram illustrating an example of a functional configuration of the information processing apparatus 1.

FIG. 13 is a diagram illustrating an example of a functional configuration of the information processing apparatus 1. The processor 11 of the information processing apparatus 1 executes a program stored in the memory 12 to function as a reception unit 111, a setting unit 112, an acquisition unit 113, a recognition unit 114, a specifying unit 115, an extraction unit 116, a presenting unit 117, and a generation unit 118.

The reception unit 111 receives an input of the user for changing or adding the second rule or the third rule, from the terminal 2. The reception unit 111 receives, from the terminal 2, an input of the user for designating the type of form, an application associated with the corresponding type, the order of attributes assigned to the corresponding type of form, and field names utilized as attribute names being the names of the attributes. The reception unit 111 receives, from the terminal 2, correction of the rule for specifying the region in which the item value of the attribute assigned to the form is shown.

The setting unit 112 adds a new second rule and a new third rule to the second rule DB 122 and the third rule DB 123 and changes the contents of the rule DB 122 and the third rule DB 123, in response to the input of the user received by the reception unit 111. The setting unit 112 associates the type of form with an application provided by the server device 6 and stores the resultant of the association in the template DB 124, in response to the input of the user received by the reception unit 111.

The setting unit 112 sets the attribute assigned to the form for each type of form. The setting unit selects a rule for specifying a region in which the corresponding item value is shown, from the first rule, the second rule, and the third rule, for each item of the attribute, and then stores the selected rule in the template DB 124. The setting unit 112 corrects the setting contents of the template DB 124 in response to the input of the user received by the reception unit 111.

The processor 11 functioning as the setting unit 112 is an example of a processor that sets a rule for specifying a region in which a value of an item of an attribute assigned to a form shown by an image is shown in the image for each item, from a predetermined first rule, a second rule indicating an arrangement of the region for an element included in the form, which is input by a user, and a third rule indicating coordinates of the region in the image, which are input by the user.

The acquisition unit 113 acquires image data indicating an image of a form scanned by the image scanning device 4 and the type of the form, which is designated by the user.

The recognition unit 114 performs an optical text recognition process on the image data acquired by the acquisition unit 113 to recognize the text described in the form and generate the entire recognition data.

The specifying unit 115 uses the rule set in the template DB 124 to specify a region in which an item value of an attribute assigned to the type of form designated by the user is shown in an image indicated by the image data acquired by the acquisition unit 113.

The extraction unit 116 extracts the item value shown in the region specified by the specifying unit 115. The extraction unit 116 may extract the item value from the entire recognition data. The extraction unit 116 may cut out the above-described specified region from the image indicated by the image data, and cause the recognition unit 114 to perform the optical text recognition process on the image of the cut out region. The extraction unit 116 stores the item value extracted for each page of the form in the form DB 125 in association with the item ID.

That is, the processor 11 functioning as the specifying unit 115 and the extraction unit 116 is an example of a processor that extracts a value of an item shown in the region specified using the set rule.

The presenting unit 117 presents, to the user, coordinates of the region specified by the specifying unit 115 and the item value extracted by the extraction unit 116 by transmission to the terminal 2.

The generation unit 118 refers to the template DB 124 to extract candidates for a rule for specifying the region in which the item value of the attribute assigned to the form is shown, and generate a candidate list formed by the extracted candidates. For example, the generation unit 118 generates the candidate list for each item of the attribute, in accordance with the number of times of adopting the rule. Here, "adoption" of a rule means that the rule is selected after check and correction by the user and is used for extracting the item value.

The generation unit 118 may include one or more rules adopted for specifying a region in which the item value of another attribute having a similar attribute name is shown, in the candidate list as a candidate for the rule for specifying the rule in which the item value of the attribute called by the attribute name is shown. The similarity determination between the attribute names may be performed by, for example, the Levenshtein distance, or by vector expression using a corpus.

The presenting unit 117 presents the candidate list generated by the generation unit 118, to the user by transmission to the terminal 2. In this case, the reception unit 111 receives an instruction to select any rule in the candidate list, from the terminal 2.

That is, the processor 11 functioning as the reception unit 111, the generation unit 118, and the presenting unit 117 is an example of a processor that acquires a list of an item of an attribute assigned to a form, present, to a user, one or more rules that are previously selected, for an item similar to the item included in the list, and causes the user to select a rule for specifying a region in which a value of the item is shown, from the one or more rules.

Operation of Information Processing Apparatus Overall Operation

Figure 14:
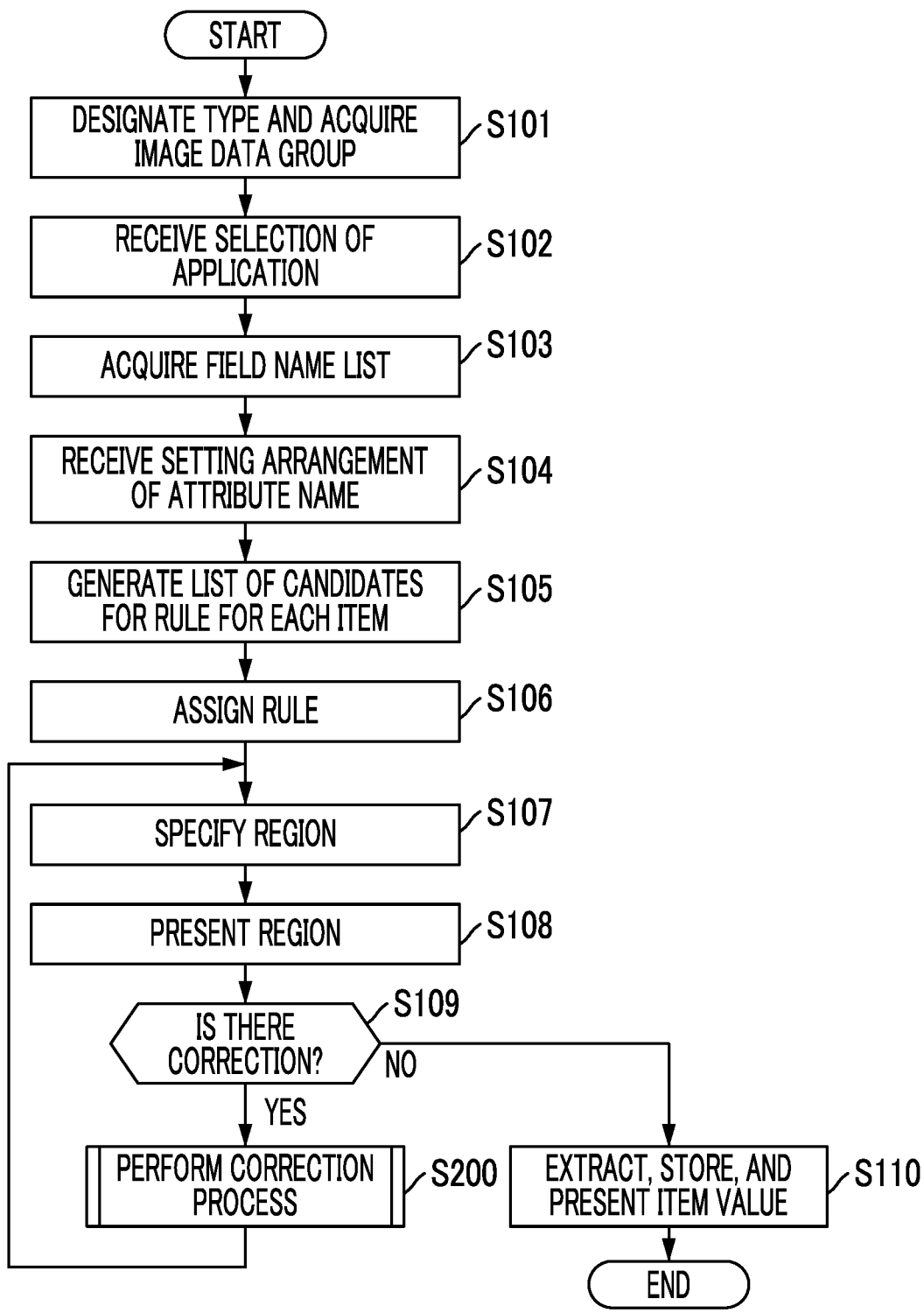
FIG. 14 is a flowchart illustrating an example of a flow of an overall operation of the information processing apparatus 1.

FIG. 14 is a flowchart illustrating an example of a flow of an overall operation of the information processing apparatus 1. The processor 11 of the information processing apparatus 1 acquires the designation of a type by the user and image data group corresponding to a bundle of the scanned forms, from the image scanning device 4 via the interface 13 and the communication line 3 (Step S101).

FIGS. 15A to 15C are diagrams illustrating an example of a reception screen presented to the terminal 2 by the information processing apparatus 1. In Step S101, for example, the processor 11 causes the terminal 2 to present a dialog box illustrated in FIG. 15A. A form F1 in the dialog box is an input field for receiving a text string input from a keyboard or the like, as the designation of the type name of a form. In the example illustrated in FIG. 15A, the user inputs a text string of "machine and materials department quotation sheet" in the form F1. Thus, a type name of "machine and materials department quotation sheet" is assigned to a bundle of forms scanned by the image scanning device 4.

A button B1 illustrated in FIG. 15A is a button on which a text string of "acquire" is described, and is a button for receiving an instruction to acquire an image data group indicating an image of a form scanned by the image scanning device 4. In a case where the user presses the button B1, the terminal 2 transmits this operation to the information processing apparatus 1. The processor 11 of the information processing apparatus 1 acquires the type name designated from the terminal 2 and acquires the image data group from the image scanning device 4. In a case where the type name of "machine and materials department quotation sheet" is a new type name that is not yet stored in the template DB 124, the processor 11 assigns a new type ID to this type name.

Then, the processor 11 acquires a list of applications provided by the server device 6 from the server device 6 and causes the acquired list to be presented to the terminal 2, and then receives a selection of the cooperated application from the list (Step S102).

In Step S102, for example, the processor 11 causes a dialog box illustrated in FIG. 15B to be presented to the terminal 2. A pull-down menu B2 in this dialog box is a menu for displaying a list of application names acquired from the server device 6 and causing the user to select an application called by any application name. In the example illustrated in FIG. 15B, the user selects the application name of "estimate work" by the pull-down menu B2.

A button B3 illustrated in FIG. 15B is a button on which the text string of "acquire" is described, and is a button for receiving an instruction to acquire the field name list from the application called by the application name selected by the pull-down menu B2.

In a case where the user presses the button B3, the terminal 2 transmits this operation to the information processing apparatus 1. The processor 11 of the information processing apparatus 1 acquires the application name selected from the terminal 2, and acquires the field name list defined by the application called by the application name, from the server device 6. Thus, the image data group acquired from the image scanning device 4 is cooperated with the application called by the application name of "estimate work" performed by the server device 6.

The processor 11 acquires the field name list of the application selected by the user, from the server device 6 (Step S103), and sets the field name as the attribute name assigned to each page of the above-described form bundle. The processor 11 receives the setting of the arrangement of the attribute names by the user, from the terminal 2 (Step S104).

In Step S104, for example, the processor 11 causes a dialog box illustrated in FIG. 15C to be presented to the terminal 2. An attribute name list L1 is a list in which the attribute name for each item of the attribute assigned to the form is listed. In the attribute name list L1 in the initial state, the field names listed in the field name list are listed in that order.

An operation menu B4 is a menu for an instruction to, for example, change or delete the order of individual attribute names. For example, in a case where the user selects the menu described as "up" in the operation menu B4, the processor 11 moves the order of the corresponding attribute name up. For example, in a case where the user selects the menu described as "delete" in the operation menu B4, the processor 11 deletes the corresponding attribute name from the attribute name list L1. With such an instruction, the arrangement of the attribute names listing the attributes assigned to the form is set.

In a case where the arrangement of the attribute names listing the attributes assigned to the form is set by the instruction of the user, the processor 11 generates a candidate list of a rule for specifying the region in which the item value is shown for each item of each attribute. The processor 11 refers to the contents of the template DB 124, for example, to count the number of times of each rule being adopted until now, for each item of the attribute, and extracts the rule of which the number of times is greater than a threshold value. In this manner, the processor 11 generates the candidate list (Step S105).

In a case where the processor 11 generates the candidate list, the processor 11 assigns any rule included in the candidate list to each item of the attribute. For example, the processor 11 assigns the rule which is most frequently adopted in the candidate list, to the item (Step S106).

The processor 11 specifies the region in which the item value is shown in the image of the form (Step S107) by the assigned rule, and causes a position of the specified region to be presented to the terminal 2 with being superimposed on the image of the form (Step S108).

At this time, the processor 11 transmits an instruction to the terminal 2 so that the position of the region is presented in a different manner for each type of the rule specifying the region. Thus, for example, the terminal 2 displays, on the display unit 25, a region specified by the first rule in a blue frame, a region specified by the second rule in a green frame, and a region specified by the third rule in a yellow frame. In this case, the processor 11 is an example of a processor that presents the respective regions specified by the first rule, the second rule, and the third rule, to the user in different manners.

FIG. 16 is a diagram illustrating an example of a screen in which the region is presented with being superimposed on the image of the form. In FIG. 16, a region in which the item value of the attribute is shown in an image G is indicated by a frame with being superimposed on the image G of the form.

In a case where the user performs, for example, a so-called mouse-over operation on the region indicated with being superimposed on the image G, a notification of the attribute name of the item associated with this region is issued. The notification may be issued, for example, by displaying the attribute name in a balloon. In a case where the list of attribute names is already displayed, the notification may be issued by emphasizing the attribute name corresponding to the above region in the list. Thus, the user knows the item value of the attribute, which is shown in the region indicated with being superimposed on the image G.

For example, a region D2, a region D3, a region D4, a region D6, and a region D7 illustrated in FIG. 16 are regions in which item values corresponding to items identified by the item IDs "A2", "A3", "A4", "A6", and "A7" are shown, respectively.

The selection rules corresponding to the regions are identified by the rule IDs "Ra1", "Ra2", "Ra3", "Ra4", and "Ra5" as in the template DB 124 illustrated in FIG. 9. These selection rules are all classified into the first rule. Therefore, as illustrated in FIG. 16, the terminal 2 presents the regions to the user by frames or the like having a common color, a common shape, and the like. In FIG. 16, the regions are displayed as regions surrounded by the common one-dot chain line. As described above, these regions may be displayed by a blue frame or the like.

As illustrated in FIG. 16, the region D1 and the region D8 are the regions in which the item values corresponding to the items identified by the item IDs "A1" and "A8" are shown, respectively. As in the template DB 124 illustrated in FIG. 9, the rule IDs of the corresponding selection rules of the region D1 and the region D8 are "Rb1" and "Rb6". Both selection rules are classified into the second rule. In FIG. 16, the regions are displayed as regions surrounded by the common broken line. As described above, these regions may be displayed by a green frame or the like.

In the example illustrated in FIG. 16, the region in which the text string of "subject:" is displayed on the left side of the region D1 is presented in association with the region D1 in a manner common to the region D1. The region in which the text string of "payment bank:" is displayed on the left side of the region D8 is presented in association with the region D8 in a manner common to the region D8. From such presentations, the user knows that the second rules for specifying the region D1 and the region D8 uses, as elements, the regions in which "subject:" and "payment bank:" are written, respectively.

That is, the processor 11 is an example of a processor that, in a case where a region is specified by the second rule, presents the position of the element indicated by the second rule in the image to the user in association with the region.

The region D5 illustrated in FIG. 16 is displayed in a manner (surrounding with one-dot chain line) indicating that the region D5 is specified by any one of the first rules. The position of the region D5 is incorrect and is required to be corrected. The region in which the item value of the attribute called by the attribute name "note", which is identified by the item ID "A9" illustrated in FIG. 9, is shown is not specified in FIG. 16.

The terminal 2 that has received the instruction to present the region, from the information processing apparatus 1, presents the region and receives the input of the correction by the user from the operation unit 24. In a case where the terminal receives the input of the correction, the terminal 2 transmits the input contents to the information processing apparatus 1.

The processor 11 determines whether or not the correction has been input by the user (Step S109). For example, a button B5 disposed under the image G illustrated in FIG. 16 is a button for displaying a screen (referred to as a correction screen) for correcting the rule, and a button on which the text string of to the rule correction screen" is described. In a case where the button B5 is pressed by the user, the processor 11 determines that the correction has been input, and then displays the correction screen.

For example, a button B6 disposed under the image G illustrated in FIG. 16 is a button for confirming the rule, and is a button on which the text string of "confirm" is described. In a case where the button B6 is pressed by the user, the processor 11 determines that the correction is not input, and confirms the position of the region displayed with being superimposed on the image G illustrated in FIG. 16.

In a case where it is determined that the correction is not input (Step S109; NO), the processor 11 extracts the item value shown in the region specified in Step S107, and stores the extracted item value in the form DB 125, and then causes the item value to be presented to the terminal 2 (Step S110). Then, the processor 11 ends the process. Thus, attributes are assigned to the image of the scanned form.

At this time, the processor 11 may present the item value shown in the specified region in association with the region. For example, in a case where the user activates the field in which the item value is presented by mouse-over or the like, the processor 11 may instruct the terminal 2 to emphasize the frame surrounding the region in which the item value is shown. The manner of the emphasis is, for example, thickening a border or blinking.

The processor 11 is an example of a processor that presents, to the user, the value of the item extracted from the region in association with the region.

In a case where it is determined that the correction has been input (Step S109; YES), the processor 11 performs a correction process (Step S200) and returns the process to Step S107.

Operation of Correction Process

Figure 17:
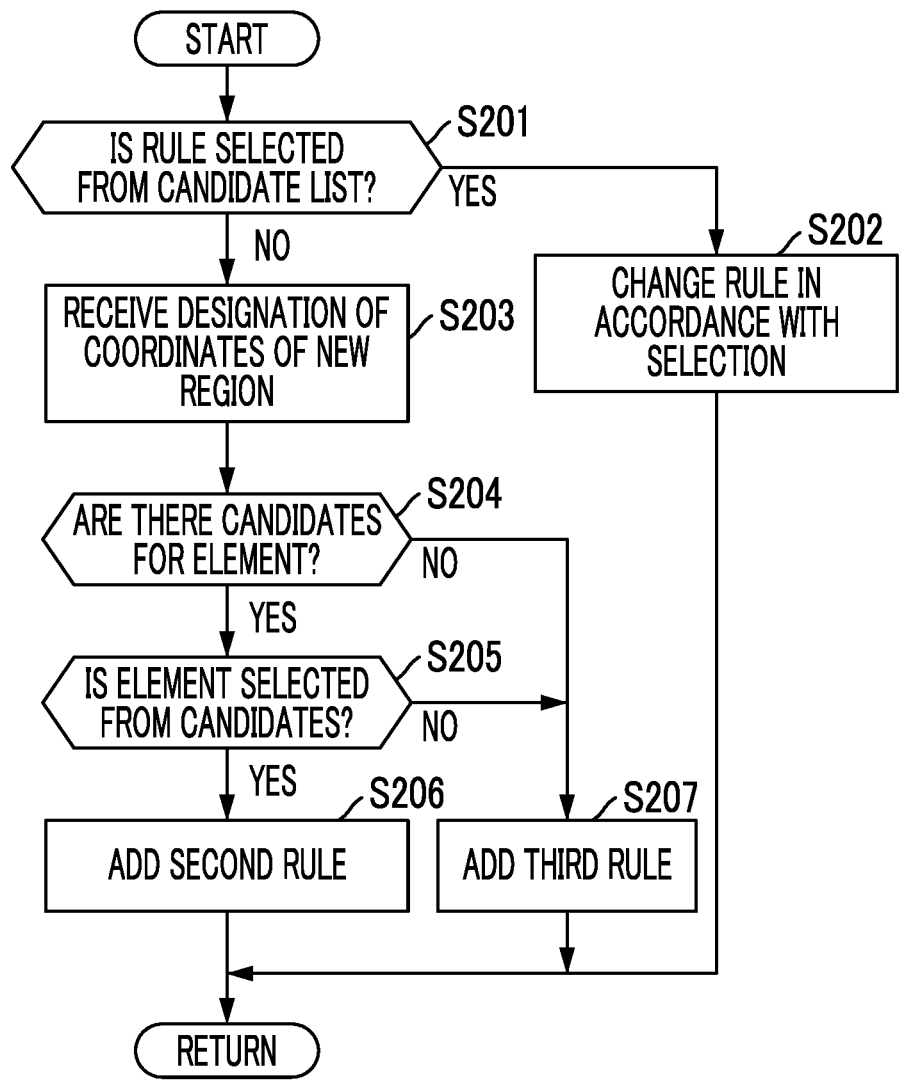
FIG. 17 is a flowchart illustrating an example of an operation flow of a correction process of the information processing apparatus 1.

FIG. 17 is a flowchart illustrating an example of an operation flow of the correction process of the information processing apparatus 1. In a case where the processor 11 of the information processing apparatus 1 determines that the correction has been input in Step S109, the processor 11 displays the correction screen.

FIGS. 18A and 18B are diagrams illustrating an example of the correction screen. On the correction screen illustrated in FIG. 18A, the selection rule selected to specify the region in which the item value of the attribute is shown is displayed in association with each attribute name indicating the attribute assigned to the form. The selection rule is displayed in a manner of a pull-down menu and the selection of the user is received in the display of the selection rule.

For example, a pull-down menu B7 illustrated in FIG. 18A is a pull-down menu for selecting the rule for specifying a region in which item value of the attribute called by the attribute name "person in charge" is shown. For example, in a case where the user clicks the pull-down menu B7 on the correction screen, a list L2 illustrated in FIG. 18B is expanded. In the list L2, a candidate for another rule is listed for each line, and a line called "new creation" indicating an instruction to create a new rule is included.

The processor 11 determines whether or not the instruction of the user means that a rule is selected from the candidate list (Step S201). For example, in a case where the user selects a line other than the line "new creation" in the list L2 illustrated in FIG. 18B, the processor 11 determines that the instruction of the user means that the rule is selected from the candidate list.

In a case where the processor 11 determines that the instruction of the user means that the rule is selected from the candidate list (Step S201; YES), the processor 11 changes the rule in response to the selection (Step S202), and ends the correction process.

For example, in the initial state of the correction screen illustrated in FIG. 18A, the pull-down menu B7 selects "1, Ra9 ( . . . )". That is, in the initial state, the processor 11 selects the first rule identified by the rule ID "Ra9" as the rule for specifying the region in which the item value of the attribute is shown. However, with the selection of the above rule, as described above, the position of the region D5 is erroneously specified.

In a case where the user selects "2, Rb2 (right of "person in charge:" . . . )" in the expanded list L2 illustrated in FIG. 18B, the processor 11 changes the rule for specifying the region in which the item value of the attribute called by the attribute name "person in charge" and updates the contents of the template DB 124. Thus, the processor 11 specifies the position of the region D5 by using the second rule which is newly set and is identified by the rule ID "Rb2".

FIG. 19 is a diagram illustrating an example of a screen in which a corrected region is presented with being superimposed on the image of the form. The processor 11 specifies the position of the region D5 by using the second rule which is newly set and is identified by the rule ID "Rb2". As a result, the processor 11 specifies the region D5 on the right side of the text string of "person in charge:". The processor 11 extracts, as the item value, the text string of "Ryoji Tanabe" displayed in the region D5.

In a case where the processor 11 determines that the instruction of the user does not mean that the rule is selected from the candidate list (Step S201; NO), the processor 11 receives the designation of the coordinates of a new region (Step S203).

For example, in a case where the user selects the line "new creation" in the list L2 illustrated in FIG. 18B, the processor 11 determines that the instruction of the user does not mean that the rule is selected from the candidate list.

The designation of the coordinates of the new region may be received by the operation on the image G of the form described above. For example, in a case where the user moves the region D5 illustrated in FIG. 16 to the position of the region D5 illustrated in FIG. 19 along an arrow C1 by a so-called drag-and-drop operation or the like with a mouse, the processor 11 acquires the new coordinates of the designated region D5.

For example, in a case where the user moves the mouse pointer along an arrow C2 illustrated in FIG. 19 by a so-called drag-and-drop operation or the like, the processor 11 coordinates of a rectangle in which the start point of the arrow C2 is set as the upper left vertex and the end point of the arrow C2 is set as the lower right vertex, as the coordinates of a new region D9.

In a case where the processor 11 receives the designation of the coordinates of the new region, the processor 11 determines whether or not there are a candidate for the element forming the second rule around the region (Step S204).

For example, the region D5 illustrated in FIG. 19 has an area in which the text string of "person in charge:" is shown, on the left side of the region D5. Thus, the processor 11 determines that the text string of "person in charge" is provided as the candidate for the element, in the new designated region D5.

There is no candidate for the element forming the second rule around the region D9 illustrated in FIG. 19. Thus, the processor 11 determines that the candidate for the element forming the second rule is not provided around the region D9.

In a case where the processor 11 determines that there is the candidate for the element (Step S204; YES), the processor 11 causes the terminal 2 to present the candidate for the element to the user and, receives an instruction. The processor 11 determines whether or not the received instruction of the user means that the element is selected from the presented candidates (Step S205).

In a case where the processor 11 determines that the instruction of the user means that the element is selected from the presented candidates (Step S205; YES), the processor 11 adds a second rule using the element selected from the candidates (Step S206), and then ends the correction process.

In a case where the processor 11 determines, in the determination of Step S205, that the instruction of the user does not mean that the element is selected from the presented candidates (Step S205; NO), and determines, in the determination of Step S204, that there is no candidate for the element (Step S204; NO), the processor 11 adds a third rule using the designated coordinates (Step S207), and ends the correction process.

The content corrected by the correction process is applied to the second rule DB 122, the third rule DB 123, and the template DB 124 of the memory 12. Regarding a form (referred to as the second form) having a type common to the form (referred to as a first form) used in the correction process, the rule associated with the corresponding type is selected for each item in the template DB 124. As a result, the user just confirms and corrects the rule using the first form, and thereby it is possible to extract the item value of the attribute by using the rule confirmed by the user even for the second form having a type common to the first form.

Thus, the processor 11 is an example of a processor that extracts a value of each item of an attribute assigned to a second form by using a rule selected by the user for each item of an attribute assigned to a first form in a second form having the same type as the first form.

In the above-described example, the processor 11 specifies the region D5 by using the first rule, and causes the user to select whether or not the first rule used for the region D5 is changed to the second rule or the third rule. That is, the processor 11 is an example of a processor that specifies a region by using the first rule for each item of an attribute, presents the specified region to the user, and causes the user to select whether or not the first rule is changed to the second rule or the third rule.

With the operation described above, the information processing apparatus 1 of the information processing system 9 causes the user of the terminal 2 to set a rule for extracting the value of the item of the attribute assigned to a form from the form, among the first rule, the second rule, and the third rule.

MODIFICATION EXAMPLES

The exemplary embodiment has been described above, but the content of the exemplary embodiment may be modified as follows. The modification examples as follows may be combined with each other.

1

In the above-described exemplary embodiment, the information processing apparatus 1 includes the processor 11 configured by a CPU, but a control unit that controls the information processing apparatus 1 may have another configuration. For example, the information processing apparatus 1 may include various processors and the like in addition to the CPU.

In the embodiments above, the term "processor" refers to hardware in abroad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

2

In the embodiments above, the term "processor" is broad enough to encompass one processor or plural processors in collaboration which are located physically apart from each other but may work cooperatively.

The order of operations of the processor is not limited to one described in the embodiments above, and may be changed.

3

In the above-described exemplary embodiment, the information processing apparatus 1 may have the function of the terminal 2. In this case, the information processing apparatus 1 may have a configuration corresponding to the operation unit 24 and the display unit 25 in the terminal 2. The image scanning device 4 may have the function of the terminal 2.

4

In the above-described exemplary embodiment, the information processing system 9 includes the communication line 5 and the server device 6, but may not include the communication line 5 and the server device 6. In this case, for example, the information processing apparatus 1 may cause the user to input a list of attribute names for each type of form. Also, regarding a form having a type name similar to the type name of the form designated by the user, information of the attribute previously assigned may be read from the template DB 124, and the attribute name indicating the attribute to be assigned to the form may be inferred. The information processing apparatus 1 may correct the inferred attribute name in response to the instruction of the user.

5

In the above-described exemplary embodiment, the program executed by the processor 11 of the information processing apparatus 1 is an example of a program causing a computer including a processor to execute a step of setting a rule for specifying a region in which a value of an item of an attribute assigned to a form shown by an image is shown in the image for each item, from a predetermined first rule, a second rule indicating an arrangement of the region for an element included in the form, which is input by a user, and a third rule indicating coordinates of the region in the image, which are input by the user, and a step of extracting the value of the item shown in the region specified by using the set rule.

The program may be provided in a state of being stored in a recording medium that can be scanned by a computer device, such as a magnetic recording medium such as a magnetic tape and a magnetic disk, an optical recording medium such as an optical disk, an optical magnetic recording medium, and a semiconductor memory. The program may be downloaded via a communication line such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a processor configured to:
   set a rule for specifying a region in which a value of an item of an attribute assigned to a form shown by an image is shown in the image for each item, from a predetermined first rule, a second rule indicating an arrangement of the region for an element included in the form, which is input by a user, and a third rule indicating coordinates of the region in the image, which are input by the user; and
   extract the value of the item shown in the region specified by using the set rule.

2. The information processing apparatus according to claim 1, wherein the processor is configured to:
   present, to the user, the respective regions specified by the first rule, the second rule, and the third rule in different manners.

3. The information processing apparatus according to claim 2, wherein the processor is configured to:
   in a case where the region is specified by the second rule, present, to the user, a position of the element indicated by the second rule in the image, in association with the region.

4. The information processing apparatus according to claim 3, wherein the processor is configured to:
   present, to the user, the value of the item extracted from the region in association with the corresponding region.

5. The information processing apparatus according to claim 4, wherein the processor is configured to:
   specify the region by using the first rule for each item of the attribute;

present the specified region to the user; and cause the user to select whether or not to change the first rule to the second rule or the third rule.

6. The information processing apparatus according to claim 4, wherein the processor is configured to:

extract a value of each item of an attribute assigned to a second form having the same type as the first form by using a rule selected by the user for each item of an attribute assigned to a first form in the second form.

7. The information processing apparatus according to claim 3, wherein the processor is configured to:

specify the region by using the first rule for each item of the attribute;

present the specified region to the user; and cause the user to select whether or not to change the first rule to the second rule or the third rule.

8. The information processing apparatus according to claim 3, wherein the processor is configured to:

extract a value of each item of an attribute assigned to a second form having the same type as the first form by using a rule selected by the user for each item of an attribute assigned to a first form in the second form.

9. The information processing apparatus according to claim 2, wherein the processor is configured to:

present, to the user, the value of the item extracted from the region in association with the corresponding region.

10. The information processing apparatus according to claim 9, wherein the processor is configured to:

specify the region by using the first rule for each item of the attribute;

present the specified region to the user; and cause the user to select whether or not to change the first rule to the second rule or the third rule.

11. The information processing apparatus according to claim 9, wherein the processor is configured to:

extract a value of each item of an attribute assigned to a second form having the same type as the first form by using a rule selected by the user for each item of an attribute assigned to a first form in the second form.

12. The information processing apparatus according to claim 2, wherein the processor is configured to:

specify the region by using the first rule for each item of the attribute;

present the specified region to the user; and cause the user to select whether or not to change the first rule to the second rule or the third rule.

13. The information processing apparatus according to claim 12, wherein the processor is configured to:

extract a value of each item of an attribute assigned to a second form having the same type as the first form by using a rule selected by the user for each item of an attribute assigned to a first form in the second form.

14. The information processing apparatus according to claim 2, wherein the processor is configured to:

extract a value of each item of an attribute assigned to a second form having the same type as the first form by using a rule selected by the user for each item of an attribute assigned to a first form in the second form.

15. The information processing apparatus according to claim 1, wherein the processor is configured to:

specify the region by using the first rule for each item of the attribute;

present the specified region to the user; and cause the user to select whether or not to change the first rule to the second rule or the third rule.

16. The information processing apparatus according to claim 15, wherein the processor is configured to:

extract a value of each item of an attribute assigned to a second form having the same type as the first form by using a rule selected by the user for each item of an attribute assigned to a first form in the second form.

17. The information processing apparatus according to claim 1, wherein the processor is configured to:

extract a value of each item of an attribute assigned to a second form having the same type as the first form by using a rule selected by the user for each item of an attribute assigned to a first form in the second form.

18. The information processing apparatus according to claim 1, wherein the processor is configured to:

acquire a list of an item of an attribute assigned to a form;

present, to a user, one or more rules that are previously selected, for an item similar to the item included in the list; and cause the user to select a rule for specifying a region in which a value of the item is shown from the one or more rules.

19. A non-transitory computer readable medium storing a program causing a computer having a processor to execute a process comprising:

setting a rule for specifying a region in which a value of an item of an attribute assigned to a form shown by an image is shown in the image for each item, from a predetermined first rule, a second rule indicating an arrangement of the region for an element included in the form, which is input by a user, and a third rule indicating coordinates of the region in the image, which are input by the user; and extracting the value of the item shown in the region specified by using the set rule.

20. An information processing method comprising:

setting a rule for specifying a region in which a value of an item of an attribute assigned to a form shown by an image is shown in the image for each item, from a predetermined first rule, a second rule indicating an arrangement of the region for an element included in the form, which is input by a user, and a third rule indicating coordinates of the region in the image, which are input by the user; and extracting the value of the item shown in the region specified by using the set rule.

* * * * *